May 1, 1956  L. J. FILAR  2,744,143
MANUFACTURE OF PHENOLS
Filed Sept. 2, 1953
FIGURE I
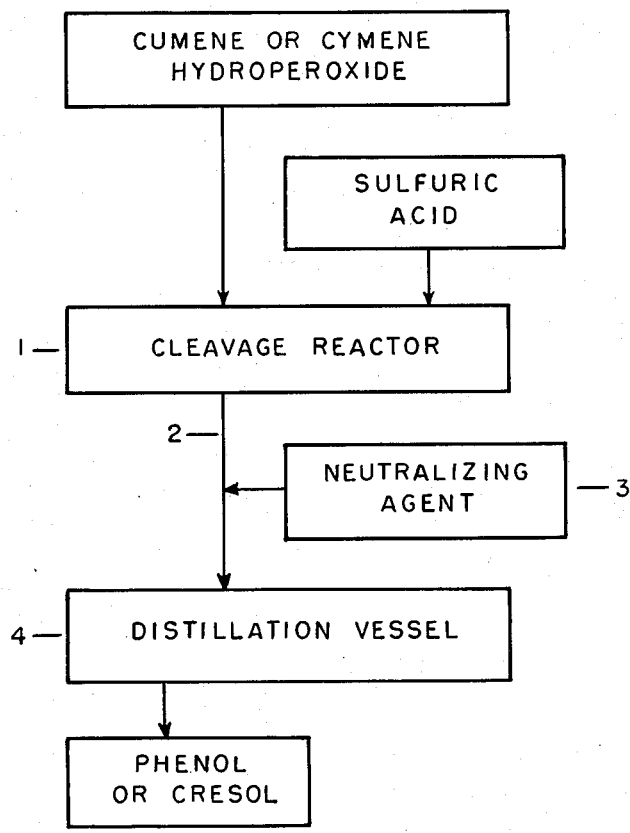
INVENTOR.
LEO J. FILAR
BY Ernest G. Peterson
Agent

2,744,143

MANUFACTURE OF PHENOLS

Leo J. Filar, Wilmington, Del., assignor to Hercules Powder Company, Wilmington, Del., a corporation of Delaware Application September 2, 1953, Serial No. 378,159

8 Claims. (Cl. 260—621)

This invention relates to the manufacture of low molecular weight phenols and more particularly to the manufacture of phenol and cresols by acid catalyzed cleavage of cumene hydroperoxide and cymene hydroperoxides, respectively.

In the process of producing phenols by the sulfuric acid catalyzed cleavage of cumene hydroperoxide or cymene hydroperoxide, a reaction mixture of the phenol, acetone and by-products containing the sulfuric acid cleavage acid is obtained. Prior to distilling this mixture to recover the phenol and other products it is desirable to remove or neutralize the cleavage catalyst. The obvious neutralization methods such as addition of aqueous sodium hydroxide, aqueous sodium carbonate, and solid alkalies such as lime, sodium carbonate, pulverized sodium hydroxide, etc., either cause processing difficulties or are too slow for use in a continuous system where it is particularly desirable to neutralize by continuous addition of the alkali.

Now in accordance with this invention, it has been found that the hydroperoxide cleavage reaction mixture containing the phenol, acetone and by-products and sulfuric acid catalyst is readily and rapidly neutralized by adding a substantially chemical equivalent of the sodium salt of the phenol (sodium phenolate) in aqueous solution of concentration in the range of about 10% to about 60%.

In this specification the term "sodium phenate" is used when referring to the sodium salt of the specific phenol $C_6H_5OH$ and the term "sodium phenolate" is used when referring to the sodium salt of phenols generically. Thus, the term "sodium phenolate" is intended to include sodium p-cresylate, sodium o-cresylate and sodium m-cresylate within its scope.

The sodium phenolate solution mixes readily with the cleavage mixture, reacts rapidly, and does not cause precipitation of a gelatinous precipitate as does sodium hydroxide, and the sodium sulfate produced by neutralization of the sulfuric acid by the sodium phenolate is granular and readily filterable.

Processes for the oxidation of cumene and cymene to hydroperoxides and for acid catalyzed cleavage of the hydroperoxides to the corresponding phenols are well known in the art.

In the acid catalyzed cleavage of cumene hydroperoxide or cymene hydroperoxide for the production of the corresponding phenols, the crude oxidation mixture obtained by the oxidation of cumene or cymene, as the case may be, and containing a substantial amount of hydroperoxide either as a direct result of oxidation or by concentration of a partially oxidized mixture by distillation is contacted with mineral acid such as sulfuric acid in catalytic amount either alone or in conjunction with added acetone while heating to cause cleavage of the hydroperoxide. When the cleavage reaction is complete, it is desired to recover the acetone and phenol by distillation. Moreover, it has been observed to be advantageous to neutralize the sulfuric acid in the cleavage mixture, before carrying out this distillation to prevent further side reactions, rather than simply washing with water as in the prior art. While neutralization can be effected by washing with aqueous alkalies or by slurrying with solid alkalies, the disadvantages from an economic and engineering standpoint militate against such procedures. If the neutralization is effected by the addition of aqueous sodium hydroxide, there is a gelatinous precipitate formed initially, and only by continued stirring does this precipitate dissolved. Thus a clear distinction is observed between the use of aqueous sodium hydroxide and the use of aqueous sodium phenate or aqueous sodium cresylate. This distinction is of utmost importance from an engineering standpoint in a continuous process where the gelatinuous precipitate would interfere with a smooth flow of materials through the pipelines.

In the present invention the sodium phenolate solution is added to the acidic cleavage mixture in a chemically equivalent amount so as to produce sodium sulfate. This sodium phenolate solution dissolves completely in the mixture and sodium sulfate crystals separate in granular easily filterable form without any intermediate nonfilterable stage. After filtration, the cleavage mixture contains distillable products which are then fractionally distilled.

A flow sheet of the process of this invention is set forth in Figure 1. Figure 1 shows the flow of cumene or cymene hydroperoxide and sulfuric acid in catalytic amounts into a cleavage reactor 1 where cleavage takes place. The cleavage reaction product flows as a flowing stream 2 to a distillation vessel 4 where the cleavage mixture is separated into its component parts and the phenol is recovered therefrom. The neutralizing agent 3 of this invention is added to the flowing stream 2 of the cleavage reaction product containing sulfuric acid, in proportionate amounts based on the rate of flow of the cleavage mixture, so that the mixture entering the distillation vessel for recovery of the phenol or cresol is a cleavage mixture in which the catalyst has been neutralized.

The process of this invention is illustrated by the following examples in which parts and percentages are by weight.

Example 1

One thousand parts of isopropylbenzene was oxidized at 130° C. in a continuous manner with oxygen so that the mixture leaving the reactor contained 25.3% isopropylbenzene hydroperoxide. This mixture was added to 100 parts acetone containing 1.26 parts sulfuric acid (80%) in a cleavage reactor while heating with a hot water bath at 95–100° C. until the hydroperoxide was substantially completely used up. To this mixture was then added 25 parts 10% sodium phenate solution by proportioning pump as the solution was pumped through a mixer, and then through a filter to a stripping still where the acetone and part of the isopropylbenzene were removed at normal pressure. The residue from this stripping operation was then passed to a second still where the isopropylbenzene and α-methylstyrene were removed at 100 mm. The residue from this distillation was then fractionally distilled to obtain about 140 parts substantially pure phenol. The fractions containing impure phenol and those containing only small amounts of phenol were contacted with 5% sodium hydroxide solution for the production of sodium phenate to be used in the process.

Example 2

In a continuous process for the production of phenol from cumene hydroperoxide, the α-methylstyrene distillation fraction which was an azeotrope with phenol was continuously extracted with 4% sodium hydroxide solution at the rate of 0.343 lb. equivalents sodium hydroxide per hour, thus providing a solution of 0.324 lb. equivalents sodium phenate and 0.019 lb. equivalents sodium hydroxide per hour. The phenol-acetophenone azeotrope from the distillation was similarly extracted with 1.062 lb. equivalents sodium hydroxide per hour to produce a sodium phenate solution of 0.887 lb. equivalents sodium phenate and 0.175 lb. equivalents of free sodium hydroxide per hour. These two solutions were combined to provide 1.211 lb. equivalents of sodium phenate and 0.194 lb. equivalents of NaOH per hour. This combined stream of sodium phenate solution was fed continuously to the effluent from a cleavage reaction, containing sulfuric acid corresponding to a flow of 1.38 lb. equivalents per hour, in order to neutralize the acid catalyst. The neutralized solution was then passed through a filter and to a series of stills where the phenol was recovered as one fraction and a phenol-acetophenone azeotrope as another and a phenol-α-methylstyrene azeotrope as still another fraction. These azeotropes were extracted with 4% aqueous sodium hydroxide solutions to provide sodium phenate solutions for use in the process.

*Example 3*

About 20 parts of a cleavage mixture resulting from heating a mixture of 15 parts 90% cumene hydroperoxide with 5 parts acetone containing 1.5% sulfuric acid (corresponding to 1.27 milliequivalents sulfuric acid) was shaken with 1.8 milliequivalents of sodium phenate in a 55% aqueous solution. The sulfuric acid was completely neutralized at once and the solution was free from acid as shown by acid indicators. A similar solution when shaken with 6.7 milliequivalents of calcium hydroxide powder continued to test acidic after 10 minutes. Similar tests with 4.7 milliequivalents of anhydrous sodium carbonate, 3.0 milliequivalents of sodium bicarbonate, and 1.9 milliequivalents of saturated solution of sodium carbonate showed that acidity persisted even after 10 minutes shaking. When a similar solution was shaken with 1.9 milliequivalents of sodium hydroxide in 10% solution a gelatinous precipitate formed which on continued shaking disappeared and fine granular crystals of sodium sulfate formed.

*Example 4*

The cleavage mixture resulting from cleavage of 22% cymene hydroperoxide in cymene with sulfuric acid (1.2 gram equivalents per kilogram of cleavage mixture) was neutralized by adding to the cleavage mixture by means of a proportionating pump as it passed through a mixing chamber prior to passing through a filter on the way to a still 1.2 gram equivalents sodium p-cresylate in 5% solution at a rate corresponding to the rate of flow in equivalents of sulfuric acid in the cleavage mixture. The sodium sulfate filtered out with ease and the cleavage mixture distilled smoothly so that a good yield of cresol was obtained.

When 20% aqueous sodium hydroxide was used in place of the sodium p-cresylate in this process, a gelatinous precipitate separated and caused clogging of the filter.

The process of this invention is operable in both batch and continuous systems. However, the greatest advantage is noted in continuous systems where speed of neutralization and freedom from gelation are particularly desired. The process is not limited to any particular type of apparatus.

The concentration of aqueous sodium phenolate used in the process is in the range of about 10% to about 60%. The preferred range is about 30% to about 50%. The amount of sodium phenolate used is essentially the amount required to completely neutralize the mixture without introducing excess sodium into the system. The sodium phenolate solution may contain up to 20 mole per cent sodium hydroxide (based on the total sodium) without introducing the above-mentioned disadvantages of sodium hydroxide alone. The sodium phenolate appears to aid in the dispersion of the solution in the cleavage mixture and it dissolves completely in the acetone-containing cleavage mixture without formation of an aqueous phase. Since the sodium hydroxide also neutralizes the sulfuric acid, the amount of sodium phenolate used will take this into consideration and the amount of sodium phenolate used will be correspondingly reduced. The process is generally operable even if an excess of neutralizing agent consisting of sodium hydroxide and sodium phenolate is used, however, since the amount of sulfuric acid is generally quite small and the excess introduced by neglecting the neutralizing effect of the sodium hydroxide is likewise quite small. The chief advantage of using only the exact amount of neutralizing agent required is an economic one in that there is a correspondingly greater recovery of the phenol being produced.

To avoid complicating solutions, the phenol used in the neutralizing sodium phenolate solution is preferably the same as that in the cleavage mixture. Thus, sodium phenate is used when a cumene hydroperoxide cleavage mixture containing phenol is neutralized and sodium p-cresylate is used when a p-cymene hydroperoxide cleavage mixture containing p-cresol is neutralized.

What I claim and desire to protect by Letters Patent is:

1. In a continuous process for production of a phenol by sulfuric acid catalyzed cleavage of a hydroperoxide of the group consisting of cumene hydroperoxide and a cymene hydroperoxide to the corresponding phenol in a cleavage reactor and subsequent separation of said phenol by distillation in a heated distillation vessel in which process continuous neutralization of the cleavage mixture is effected in the flowing stream of cleavage reaction mixture passing from the cleavage reactor to the distillation vessel by the proportionate continuous feeding of a neutralizing amount, based on the flow rates, of a neutralizing agent to the flowing stream of the cleavage reaction mixture, the improvement which comprises effecting neutralization by means of a neutralizing agent in which at least 80 mole per cent of the effective neutralizing component is the sodium salt of said phenol in aqueous solution of solids concentration in the range of about 10% to about 60% of said solution.

2. The process of claim 1 in which the neutralizing agent is an aqueous solution of sodium hydroxide which has been neutralized to the extent of 80–100% with the corresponding phenol, said solution having a solids concentration in the range of about 10% to about 60%.

3. The process of claim 1 in which the phenol is a cresol and the neutralizing agent is an aqueous solution of sodium hydroxide which has been neutralized to the extent of 80–100% with the corresponding cresol, said solution having a solids concentration in the range of about 10% to about 60%.

4. The process of claim 1 in which the neutralizing agent is an aqueous solution of sodium hydroxide which has been neutralized to the extent of 80–100% with phenol, said solution having a solids concentration in the range of about 30% to about 50%.

5. The process of claim 1 in which the neutralizing agent is the sodium salt of phenol in an aqueous solution of concentration in the range of about 30% to about 50%.

6. The process of claim 1 in which the phenol is a cresol and the neutralizing agent is the sodium salt of said cresol in an aqueous solution of concentration in the range of about 30% to about 50%.

7. The process of claim 6 in which the phenol is m-cresol.

8. The process of claim 6 in which the phenol is p-cresol.

References Cited in the file of this patent

UNITED STATES PATENTS

| | | |
|---|---|---|
| 1,309,683 | Hamlin | July 15, 1919 |
| 2,628,983 | Aller et al. | Feb. 17, 1953 |
| 2,663,735 | Filar et al. | Dec. 22, 1953 |

FOREIGN PATENTS

| | | |
|---|---|---|
| 507,580 | Canada | Nov. 23, 1954 |